United States Patent Office 3,224,907
Patented Dec. 21, 1965

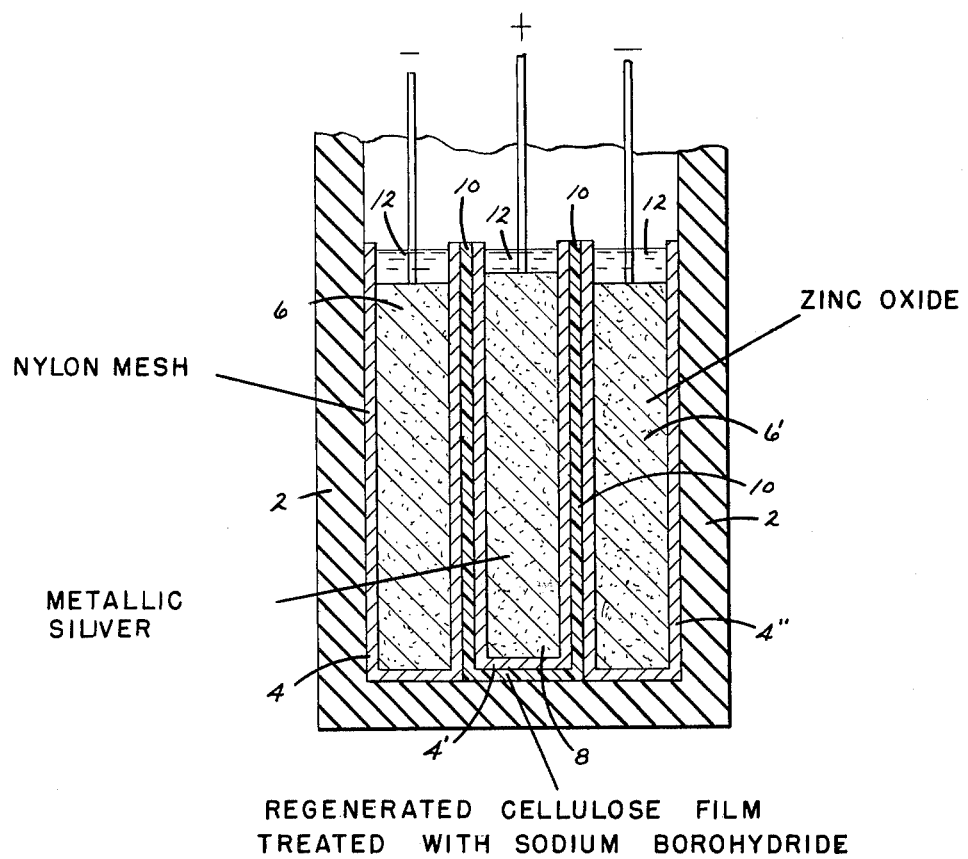

3,224,907
ELECTRO-CHEMICAL GENERATOR
Charles M. Rosser, Wallingford, and Richard A. Glinski, Clifton Heights, Pa., assignors, by mesne assignments, to FMC Corporation, San Jose, Calif., a corporation of Delaware
Filed May 11, 1962, Ser. No. 194,059
6 Claims. (Cl. 136—146)

This application is a continuation-in-part of a copending application No. 40,149 filed July 1, 1960, now Patent No. 3,091,554, issued May 28, 1963, for Oxidation-Resistant Cellulosic Pellicle and Process for the Manufacture Thereof.

This invention relates to an electro-chemical generator or battery incorporating a highly oxidation resistant semi-permeable membrane separator.

It is known to use semi-permeable cellulose membranes to separate battery electrodes in electro-chemical generators. These membranes permit the transfer of electrolyte ions but prevent the migration of larger metallic particles from one electrode to the other. These cellulose membranes are subject to oxidative deterioration caused by prolonged contact with strong acid or alkaline electrolyte solutions. Various processes and pretreatments have been used to improve the oxidation resistance of the cellulose membranes. However, many of these are comparatively expensive and not easily adapted to manufacture on a continuous basis.

It is an object of this invention to provide an electro-chemical generator having an increased number of charging cycles.

It is another object of this invention to provide an electro-chemical generator including a highly oxidation resistant non-fibrous, semi-permeable cellulosic membrane separator.

It is a still further object of this invention to provide an improved storage battery employing a zinc-containing electrode, a silver-containing electrode, an alkaline electrolyte solution and a highly oxidation resistant cellulosic membrane separating the electrodes from the electrolyte solution.

In accordance with the present invention the electro-chemical generator comprises a positive electrode, a negative electrode, an electrolyte, and a semi-permeable cellulosic electrode separator membrane treated with an alkali metal borohydride. To provide additional and unexpectedly superior oxidation resistance for the cellulosic membrane it is impregnated with a colloidal metal including gold, silver and copper. Further excellent results with respect to oxidation resistance is obtained by impregnating the membrane, with or without first impregnating with the colloidal metal, with an antioxidant amine compound.

A specific embodiment of this invention is seen in the accompanying drawing in which 2 is the battery casing. 4, 4' and 4" are permeable nylon separators. In general, any oxidation resistant cellulosic or synthetic resin fabric or mesh is useful for the permeable separator. 6 and 6' are negative electrodes of zinc oxide, and 8 is a positive electrode of silver. 10 represents one or more layers of semi-permeable membrane which, in the preferred embodiment, is denitrated cellulose nitrate treated with sodium borohydride, impregnated with colloidal silver, and additionally impregnated with an antioxidant amine compound. The invention particularly concerns storage batteries having zinc-containing electrodes, silver-containing electrodes and alkaline electrolyte solutions. The electrolyte-permeable cellulosic membrane treated in accordance with this invention produces superior oxidation resistant separators thereby greatly increasing the life of the battery.

The cellulosic sheets of this invention include flexible cellulosic films and composite sheets having cellulosic surface components. Examples of cellulosic material include regenerated cellulose produced by denitration of cellulose nitrate, by the viscose process, by cuprammonium process, by deacetylation of cellulose acetate, etc., and films of hydroxyalkyl cellulose ethers and modifications thereof. It is preferred, particularly for use as battery separators, that the cellulosic sheets consist of semi-permeable, regenerated cellulose produced by denitration of cellulose nitrate since these sheets alone have demonstrated somewhat better resistance to alkaline oxidation.

The alkali metal borohydrides in accordance with this invention include sodium, potassium and lithium borohydrides which are applied to the cellulosic sheets in aqueous solutions at concentrations sufficient to treat the cellulose at a weight ratio of about 1 part borohydride to from 2 to 50 parts of cellulose. Aqueous solutions containing from about .02 to about 1% alkali borohydride are usually sufficient for this purpose. Treatment time for the borohydride application to the cellulosic pellicle ranges from about 1 hour to 5 hours at room temperature.

It is realized that alkali metal borohydrides are known to have been used in the reduction of cellulose, particularly cellulose pulps. However, the improvement in oxidation resistance of cellulosic films afforded by the treatment thereof with the borohydrides as compared to cellulosic films employing other methods of reducing oxidation is entirely unexpected. In addition the use of the borohydride treatment permits unexpected improvement in oxidation resistance when certain other known antioxidant treatments are used in combination therewith. It appears that the carbonyl groups in cellulosic sheets are reduced by the borohydride and that this reduction leads to stabilization of sensitive linkages in the cellulose molecule. There is no explanation, however, why this treatment in combination with certain other antioxidant treatments provides synergistic oxidation resistance.

The amine type antioxidant of this invention is preferably a $C_1$–$C_{32}$ alkyl substituted diphenylamine but includes for example, naphthylamines, phenylene diamines, substituted derivatives of these amines and mixtures thereof. The amine antioxidant treatment of the cellulose pellicle generally involves the replacement of the water content of the cellulose with an organic solvent and then treatment of the film with the amine antioxidant in an organic solvent solution. Usually, the cellulosic pellicle is steeped in acetone which replaces the water in the cellulose. Then, the acetone impregnated pellicle is steeped in an organic solvent such as toluene which replaces the acetone. Thereafter the pellicle is treated with an amine-antioxidant such as octylated diphenylamine in toluene at the desired concentration. Solutions containing from 0.5% and up to the limit of solubility of the antioxidant in the organic solvent are useful and a concentration of about 2% by weight is preferred.

In order to test the oxidation resistance of the treated cellulosic sheets of this invention under strong alkaline conditions, which would duplicate as far as possible the conditions met by the cellulosic membrane used as a zinc-silver battery separator, a method for testing was used. This test consists of attaching a weight of 225 p.s.i. to a test film strip and suspending it in a flask containing a strong potassium hydroxide solution with or without the addition of silver peroxide so that one-half of the film remains above the liquid level while the remaining portion including the weight is submerged in the caustic solution at elevated temperatures. The silver peroxide may be added to the solution in order to further accelerate the test. The flask containing the caustic solution is placed in an oven at 135° F. and the length of time required for the film to break is recorded.

Test films of regenerated cellulose prepared by the denitration of cellulose nitrate and having a thickness of about 2 mils were prepared as follows.

Test film A was first washed to remove glycerine and then steeped in acetone. The acetone impregnated film was placed in toluene for 30 minutes and then placed in a toluene solution of octyl substituted diphenylamine at a concentration of about 2% by weight for about 120 minutes. The film was then dried.

Test film B was first washed to remove glycerine and then steeped in an ammoniacal solution of silver nitrate (4 gm./250 ml.). This film was then exposed to formaldehyde vapors for 10 minutes to precipitate colloidal silver therein. The colloidal silver impregnated film was then dried.

Test film C was first washed to remove glycerine and then steeped in an aqueous solution of sodium borohydride (2 gm./250 ml.) for 3 hours at room temperature. This solution gave a ratio of 1 part borohydride to 2 parts cellulose. The film was removed from the borohydride solution and water washed. The washed film was rewashed with a 1% acetic acid solution, washed again with water and dried.

Test film D was prepared as was test film C except that a less concentrated sodium borohydride solution was used. The solution concentration was 0.4 gm./250 ml. of water which gave a ratio of 1 part borohydride to 10 parts cellulose.

Test film E was prepared as were test films C and D except that a less concentrated sodium borohydride solution was used. The solution concentration was 0.08 gm./250 ml. of water which gave a ratio of 1 part borohydride to 50 parts of cellulose.

Test film F was first treated as test film D and then further treated as test film A.

Test film G was first washed to remove glycerine and then steeped in a plain aqueous solution of silver nitrate at a concentration of 4 gm./250 ml. of water. When the film was completely impregnated with silver nitrate solution it was placed in an aqueous solution of sodium borohydride having a concentration of 0.4 gm./250 ml. of water for 2 hours at room temperature. Thereafter, the film was water washed, rewashed in 1% acetic acid solution, washed again with water and dried.

Test film H was prepared as was film G and then further treated as was test film A.

The control test film was untreated having the glycerine removed by water washing.

The test films were subjected to the previously described oxidation resistance test wherein a 45% solution of KOH was used. The results of this test are set forth in the following table.

Table I

Test film:            Hours in 45% KOH at 135° F.
Control _____ 48, 46, 56, 46, 48, 45, 45.
A (amine) _____ 45, 45, 50.
B (colloidal silver) _____ 73.
C ($NaBH_4$)* _____ 159, 185, 185, 162.
D ($NaBH_4$)** _____ 93, 93, 93, 189, 93, 93.
E ($NaBH_4$)*** _____ 93, 189.
F ($NaBH_4$+Amine)** __ 48, 65, 120, 126.
G (colloidal silver
  +$NaBH_4$)** _____ 160.
H (colloidal silver
  +$NaBH_4$+amine)** __ 169, 94, 192, 172, 169. 288, 363, 503.

* Borohydride treatment with a ratio of 1 part borohydride to 2 parts cellulose.
** Borohydride treatment with a ratio of 1 part borohydride to 10 parts cellulose.
*** Borohydride treatment with a ratio of 1 part borohydride to 50 parts cellulose.

In order to check the oxidation resistance of the test films under more severe conditions the test procedure was used wherein silver peroxide (1 gm./100 ml.) was added to the KOH solution. The results of this test are set forth in the following table. The additional test film I was prepared as test film B with further treatment in the manner of treating test film A.

Table II

Test film:            Hours in 45% KOH and $Ag_2O_2$ at 135° F.
Control _____ 16, 25, 22, 23, 25, 22, 23.
A (amine) _____ 20.
B (colloidal silver) _____ 28.
D ($NaBH_4$)* _____ 69, 70.
F ($NaBH_4$+amine)* ___ 45.
G (colloidal silver
  +$NaBH_4$)* _____ 90.
H (colloidal silver
  +$NaBH_4$+amine)* ___ 744, 1176, 1110, 576.
I (colloidal silver
  +amine) _____ 46.

* Borohydride treatment with a ratio of 1 part borohydride to 10 parts cellulose.

To demonstrate this invention employing colloidal gold and copper as antioxidant agents the following data are given.

Test film J was first washed to remove glycerine and then steeped in a dilute aqueous solution of gold chloride (4 gm./250 ml.) for 2 hours. This film was then exposed to formaldehyde vapors for about 10 minutes to precipitate the gold particles therein. Thereafter, the gold impregnated sheet is further impregnated with octyl substituted diphenylamine in the manner set forth for Test film A.

Test film K was prepared by first washing the regenerated cellulose film to remove glycerine plasticizer. It was then steeped in aqueous gold chloride solution (4 gm./250 ml.) for 2 hours. The saturated film was then steeped in an aqueous solution of sodium borohydride (0.4 gm./250 ml.) for 3 hours at room temperature. The film was then water washed, washed with 1% acetic acid, rewashed with water and dried.

Test film L was prepared in the same manner as test film K and then impregnated with the amine antioxidant in the manner set forth for test film A.

Test film M was prepared in the same manner as test film L except that the gold chloride solution was replaced with an aqueous copper sulfate solution (4 gm./250 ml.).

The above test films were subjected to the test procedures described for Tables I and II and the results are set forth in the following table.

Table III

| Test film | Hours in 45% KOH at 135° F. | |
| --- | --- | --- |
| | Without $Ag_2O_2$ | With $Ag_2O_2$ |
| J (colloidal gold+amine) | 72 | 168 |
| K (gold+$NaBH_4$) | 264 | 168 |
| L (gold+$NaBH_4$+amine) | | 840 |
| M (copper+$NaBH_4$+Amine) | | 380, 364+ |

The results set forth in the above tables demonstrate conclusively the excellent oxidation resistance of the films and sheets of this invention and the unexpected improvement provided by the disclosed process. Known treatment of films to reduce oxidation are comparatively ineffective when used alone or even when combined as with test film I. However, the oxidation resistance of films treated with the borohydride is greatly improved while the combined treatments including the borohydride produce a synergistic improvement well over the expected result.

Colloidal silver impregnation with reduction of the silver salt by formaldehyde or the like appears to be far inferior in producing oxidation resistance than when the borohydride is used to simultaneously reduce the silver salt and treat the cellulose film or pellicle.

Impregnation with both gold particles and diphenylamine produces unexpected improvement in oxidation resistance either when the gold salt is reduced with ordinary reducing agents such as formaldehyde or with sodium borohydride. However, the great increase when using the borohydride treatment is totally unexpected even when compared to the excellent results obtained using formaldehyde as the reducing agent for the gold salt.

Further improvement in the method of this invention by treatment of cellulosic pellicles with aqueous alkali metal borohydride solutions in the presence of a water soluble salt of a metal of the group including lithium, magnesium, calcium, strontium and barium is expected in accordance with U.S.P. 2,898,333. Thus, in the presence of these salts smaller amounts or less concentrated aqueous solutions can be used to treat the cellulosic pellicle to obtain the desired result.

Electro-chemical generators have been assembled in accordance with this invention and evaluated. These batteries had surprisingly longer life and increased charging cycles than batteries containing conventional cellulosic semi-permeable separators.

Various changes and modifications may be made in practicing the invention without departing from the spirit and scope thereof and, therefore, the invention is not to be limited except as defined in the appended claims.

We claim:

1. An electro-chemical generator comprising a positive electrode, a negative electrode, an electrolyte, and a semi-permeable cellulosic electrode separator membrane treated with an alkali metal borohydride.

2. The electro-chemical generator of claim 1 wherein the electrode separator membrane is impregnated with a colloidal metal selected from the group consisting of silver, gold and copper.

3. The electro-chemical generator of claim 2 wherein the electrode separator membrane is impregnated with an anti-oxidant compound selected from the group consisting of diphenylamines, naphthylamines, phenylene diamines, substituted derivatives of these amines and mixtures thereof.

4. An electro-chemical generator comprising a zinc-containing electrode, a silver-containing electrode, an alkaline electrolyte solution, and a semi-permeable membrane separating said electrodes comprising regenerated cellulose film treated with sodium borohydride.

5. The electro-chemical generator of claim 4 wherein the semi-permeable membrane is impregnated with a colloidal metal selected from the group consisting of silver, gold and copper.

6. The electro-chemical generator of claim 5 wherein said semi-permeable membrane is impregnated with an antioxidant amount of an alkyl substituted diphenylamine.

References Cited by the Examiner
UNITED STATES PATENTS 2,511,472 6/1950 Kmecik _____ 117—144
2,898,333 8/1959 Jullander _____ 260—212
3,013,099 12/1961 Mendelsohn _____ 136—146

WINSTON A. DOUGLAS, *Primary Examiner.*

JOHN R. SPECK, JOHN H. MACK, *Examiners.*